US010028011B2

(12) United States Patent
Yao et al.

(10) Patent No.: US 10,028,011 B2
(45) Date of Patent: Jul. 17, 2018

(54) PREDICTIVE STORAGE OF BROADCAST CONTENT

(71) Applicant: Verizon and Redbox Digital Entertainment Services, LLC, Arlington, VA (US)

(72) Inventors: Xuefeng Yao, Weston, MA (US); Jianxiu Hao, Acton, MA (US); Yuhui Qian, Lexington, MA (US); Jian Huang, Sudbury, MA (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 136 days.

(21) Appl. No.: 14/161,304

(22) Filed: Jan. 22, 2014

(65) Prior Publication Data

US 2015/0208120 A1    Jul. 23, 2015

(51) Int. Cl.

| H04H 60/33 | (2008.01) |
|---|---|
| H04N 21/438 | (2011.01) |
| H04N 21/643 | (2011.01) |
| H04N 21/458 | (2011.01) |
| H04N 21/845 | (2011.01) |
| H04N 21/258 | (2011.01) |
| H04N 21/433 | (2011.01) |
| H04N 21/25 | (2011.01) |
| H04N 21/6543 | (2011.01) |
| H04N 21/658 | (2011.01) |
| H04N 21/2187 | (2011.01) |

(52) U.S. Cl.
CPC ....... *H04N 21/4384* (2013.01); *H04N 21/251* (2013.01); *H04N 21/25833* (2013.01); *H04N 21/25891* (2013.01); *H04N 21/4331* (2013.01); *H04N 21/458* (2013.01); *H04N 21/64322* (2013.01); *H04N 21/6543* (2013.01); *H04N 21/6582* (2013.01); *H04N 21/845* (2013.01); *H04N 21/2187* (2013.01)

(58) Field of Classification Search
None
See application file for complete search history.

(56) References Cited

U.S. PATENT DOCUMENTS

| 8,611,285 | B2 * | 12/2013 | Henning | H04N 5/4401 |
|---|---|---|---|---|
| | | | | 348/14.02 |
| 8,943,528 | B1 * | 1/2015 | Rowe | H04N 21/233 |
| | | | | 725/18 |
| 2003/0084450 | A1 * | 5/2003 | Thurston et al. | 725/46 |
| 2007/0143808 | A1 * | 6/2007 | Agrawal | H04N 7/17318 |
| | | | | 725/119 |
| 2007/0223475 | A1 * | 9/2007 | De Vleeschauwer | H04N 5/4401 |
| | | | | 370/390 |

(Continued)

*Primary Examiner* — Jason K Lin (57) ABSTRACT

A server device may determine content prediction parameters associated with multiple items of content; generate respective content prediction aggregate scores for each of the multiple items of content based on the content prediction parameters. A particular content prediction aggregate score, associated with a particular content, may be generated based on content prediction parameters associated with the particular content. The server device may generate a content prediction instruction; and may provide the content prediction instruction to cause the user device to receive and store a portion of the particular item of content.

20 Claims, 8 Drawing Sheets

(56) References Cited

U.S. PATENT DOCUMENTS

| | | | |
|---|---|---|---|
| 2008/0155623 A1* | 6/2008 | Ota | H04N 7/173 725/109 |
| 2008/0244665 A1* | 10/2008 | Bowen et al. | 725/83 |
| 2009/0002570 A1* | 1/2009 | Oki | H04N 5/4401 348/726 |
| 2009/0015725 A1* | 1/2009 | Park | H04N 5/50 348/731 |
| 2009/0049485 A1* | 2/2009 | Agrawal et al. | 725/87 |
| 2010/0058422 A1* | 3/2010 | Ochiai | H04L 47/10 725/116 |
| 2010/0287033 A1* | 11/2010 | Mathur | G06F 17/30867 705/319 |
| 2011/0099488 A1* | 4/2011 | Jin | G06F 9/44 715/764 |
| 2012/0144442 A1* | 6/2012 | Chiang | H04N 21/4384 725/109 |
| 2012/0151527 A1* | 6/2012 | Kumar | G06N 5/047 725/40 |
| 2012/0257120 A1* | 10/2012 | Nakai | H04N 5/50 348/731 |
| 2013/0227106 A1* | 8/2013 | Grinshpun | H04W 4/18 709/223 |
| 2013/0263172 A1* | 10/2013 | McCoy | H04N 21/25891 725/27 |
| 2014/0074861 A1* | 3/2014 | Bieschke | G06F 17/3053 707/748 |
| 2014/0088952 A1* | 3/2014 | Fife | G06F 17/27 704/9 |
| 2015/0121413 A1* | 4/2015 | Ramakrishnan | H04N 21/454 725/25 |

* cited by examiner

| Score Weights 410 | |
|---|---|
| Score type | Weight |
| Viewing Preference | 50% |
| Viewing History | 15% |
| Adjacent Channel | 10% |
| Popular Content | 10% |
| Content Type | 10% |
| Social Media | 5% |

Scoring Data
420

Current Channel: 5
Current Time: 5/15/13, 4 PM

| Channel | Channel Scores | | | | | | |
|---|---|---|---|---|---|---|---|
| | Viewing History Score | Viewing Preference Score | Adjacent Channel Score | Popularity Score | Related Content Score | Social Media Score | Aggregate Score |
| 1 | 8 | 5 | 7 | 4 | 3 | 9 | 555 |
| 2 | 7 | 7 | 8 | 6 | 6 | 8 | 695 |
| 3 | 10 | 8 | 9 | 9 | 9 | 10 | 870 |
| 4 | 3 | 1 | 10 | 3 | 1 | 2 | 245 |
| 6 | 6 | 8 | 10 | 7 | 5 | 5 | 735 |
| 7 | 5 | 6 | 9 | 5 | 8 | 7 | 630 |
| 8 | 1 | 4 | 8 | 4 | 2 | 9 | 400 |
| 9 | 3 | 8 | 7 | 0 | 9 | 9 | 650 |
| 10 | 5 | 10 | 6 | 9 | 4 | 4 | 785 |

PREDICTIVE STORAGE OF BROADCAST CONTENT

BACKGROUND

In a cable television (TV) system, content associated with broadcast channels can be delivered to a user device (e.g., a set-top box) via a coax or fiber cable. A user can preview and switch channels in less than 1 second since the coax or fiber has transmitted data for multiple channels to the user device. When switching channels, the STB may only need to access and de-encrypt a selected channel.

Alternatively, broadcast content can be delivered via Internet protocol (IP) networks in an IP TV system. In the IP TV system, because of limited bandwidth of the IP network, all channels may not be transmitted to the user device. When user selects to access (e.g., view or preview) content associated with a channel, the user device may generate a request to a content server to receive the content for the selected channel. Such requests and responses may take more than one second and cause a substantial delay when the user selects to access the selected content.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may predict a broadcast channel that a user may be likely to select, and may store (e.g., buffer) content, associated with the predicted broadcast channel, on a user device. The systems and/or methods may deliver the content via an Internet protocol (IP) network. As a result, the content (e.g., live broadcasted content), associated with the predicted channel, may be presented with a relatively short delay. For example, the content may be presented with a shorter delay than systems that deliver content via an IP network and do not buffer the content in advance.

Figure 1:
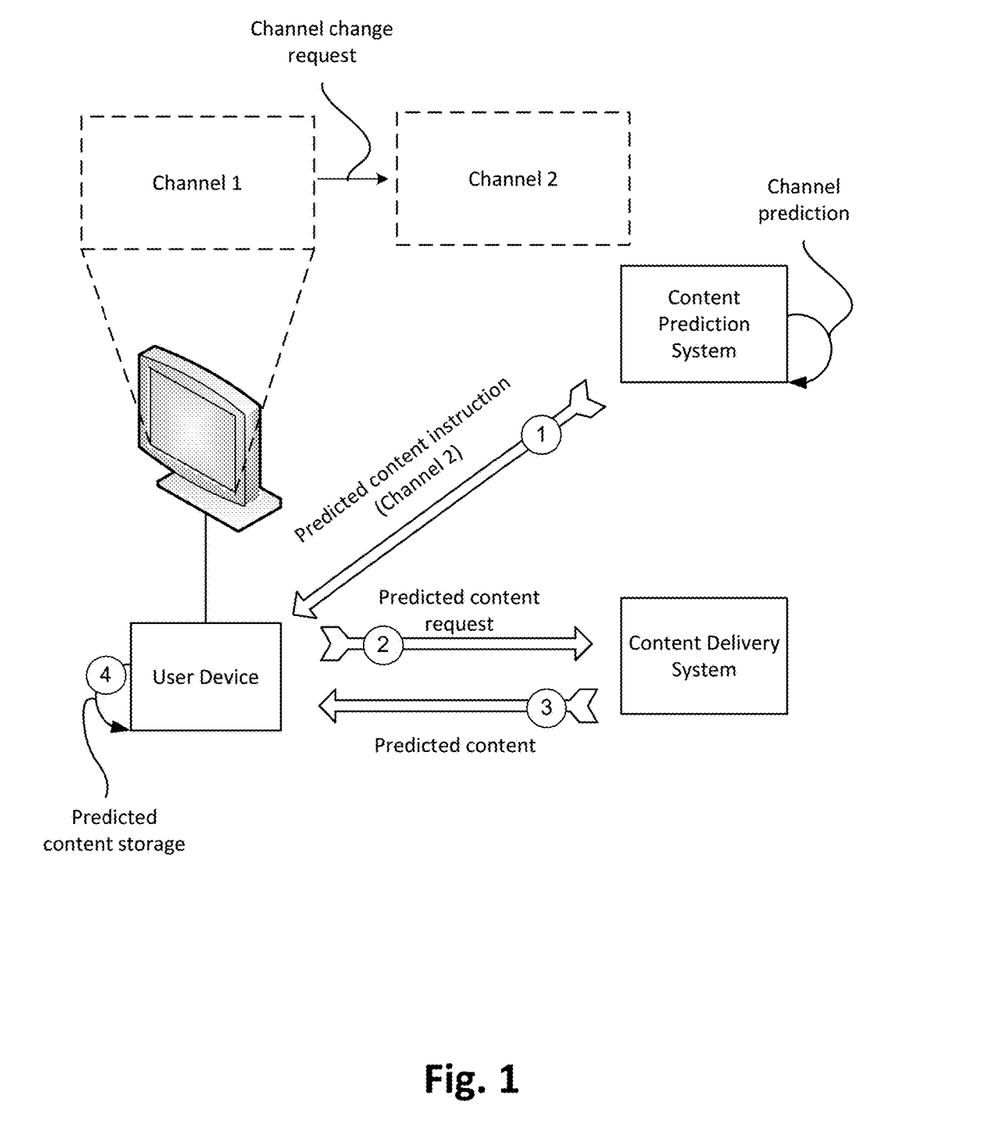
FIG. 1 illustrates an example overview of an implementation described herein.

FIG. 1 illustrates an example overview of an implementation described herein. In FIG. 1, assume that a user selects, on a user device, a particular channel (e.g., "Channel 1"). Given this assumption, the user device may request content, associated with Channel 1, from a content delivery system via an IP network. The user device may receive the content, associated with Channel 1, and may present the received content on an associated display. A content prediction system may predict channels that a user may select subsequent to selecting Channel 1 based on one or more content prediction parameters. For example, the content prediction system may predict the channels based on user viewing history, content popularity, channels that are adjacent to the current channel, channels having content of a similar type as the current channel, channels that the user has specifically indicated as "favorite" channels, etc.

In FIG. 1, assume that the content prediction system determines that the user may be likely to select Channel 2 after having selected Channel 1. Given this determination, the content prediction system may provide a predicted channel instruction to the user device (arrow 1). The predicted channel instruction may direct the user device to request content, associated with Channel 2, from the content delivery system. Based on receiving the predicted channel instruction, the user device may request the content (e.g., the predicted content), associated with Channel 2, from the content delivery system (arrow 2), and may receive the content (arrow 3). The user device may then store (e.g., buffer) an initial portion of the predicted content (arrow 4). In some implementations, the user device may buffer the initial portion of the content in a cache or local storage associated with the user device. When the user selects Channel 2, the user device may present the predicted content from the storage of the user device since the predicted content has already been requested from the content delivery system. That is, the user device may request the predicted content prior to receiving a selection for the predicted channel. As a result, the predicted content can be presented with a shorter delay, in relation to when the predicted content is requested at the time that the predicted channel is selected.

Since the user device has buffered an initial portion of the content, the initial portion of the content may be presented without delay, and any subsequent portion of the content may be requested from the content delivery system while the initial portion is presented by the user. As a result, the user device may present live broadcasted content without a delay, since an initial portion of the content has been buffered. Also, as content is continuously broadcasted, buffered content can be discarded to make storage available for newly broadcasted content. Content can be buffered on an ongoing basis as buffered content is discarded over time. While the systems and/or methods are described in terms of predicting a channel that the user may select, in practice the systems and/or methods may predict the selection of any type of content, even if the content is not associated with a broadcast channel.

Figure 2:
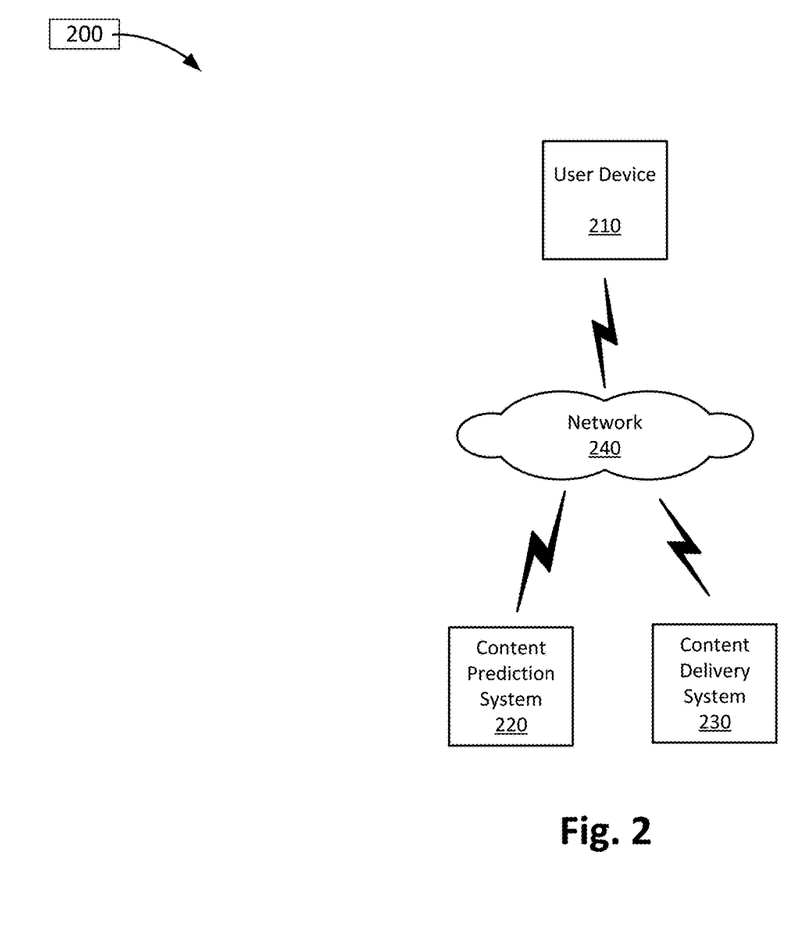
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device, content prediction system 220, content delivery system 230, and network 240.

User device 210 may include a device capable of communicating via a network (e.g., network 240), and receiving content via network 240. For example, user device 210 may correspond to an IP set-top box, a desktop computing device, a portable computer device (e.g., a laptop or a tablet computer), a gaming device, a mobile communication device (e.g., a smart phone or a personal digital assistant (PDA)), and/or some other type of computing device. In some implementations, user device 210 may receive (e.g., from a user) a selection of content stored by content delivery system 230. Based on receiving the selection, user device 210 may provide a request for the content to content delivery system 230. In some implementations, the content may correspond to live broadcasted content associated with a broadcast channel. For example, user device 210 may receive a selection of a broadcast channel, and may request content, from content delivery system 230, for content associated with the broadcast channel. User device 210 may receive a predicted content instruction, and may request predicted content, identified in the predicted content instruction, from content delivery system 230. User device 210 may buffer the predicted content so that the predicted content may be quickly presented when the predicted content is selected.

Content prediction system 220 may include one or more computing devices, such as a server device or a collection of server devices. In some implementations, content prediction system 220 may predict content that a user may be likely to select. In order to predict the content, content prediction system 220 may determine content prediction parameters, such as information identifying a user's content viewing history, a user's content preferences, a measure of content popularity, a broadcast channel associated with the content, and adjacent broadcast channels associated with the content. In some implementations, predicted content may be identified further based on a storage capacity of user device 210 and/or a particular buffer size. As described in greater detail below, the buffer size may be determined based on data transmission speeds between user device 210 and content delivery system 230. In some implementations, content prediction system 220 may monitor activity of user device 210 (e.g., broadcast channel selections, content currently being received by user device 210, etc.).

In some implementations, viewing history information may be received based on a user opting in to a service whereby viewing history information, regarding the user, is collected. In some such implementations, the user may have the option of opting out of this service at any time. Furthermore, the user may have the option to access and/or delete the viewing history information that pertains to the user.

Content delivery system 230 may include one or more computing devices, such as a server device or a collection of server devices. In some implementations, content delivery system 230 may provide digital content to user device 210 via an IP network. For example, content delivery system 230 may provide content associated with broadcast television channels. Additionally, or alternatively, content delivery system 230 may provide content that is not associated with broadcast television channels (e.g., on-demand content that may or may not be broadcast over broadcast television channels).

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wide area network (WAN), a metropolitan network (MAN), the Public Switched Telephone Network (PSTN), an ad hoc network, a managed Internet Protocol (IP network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
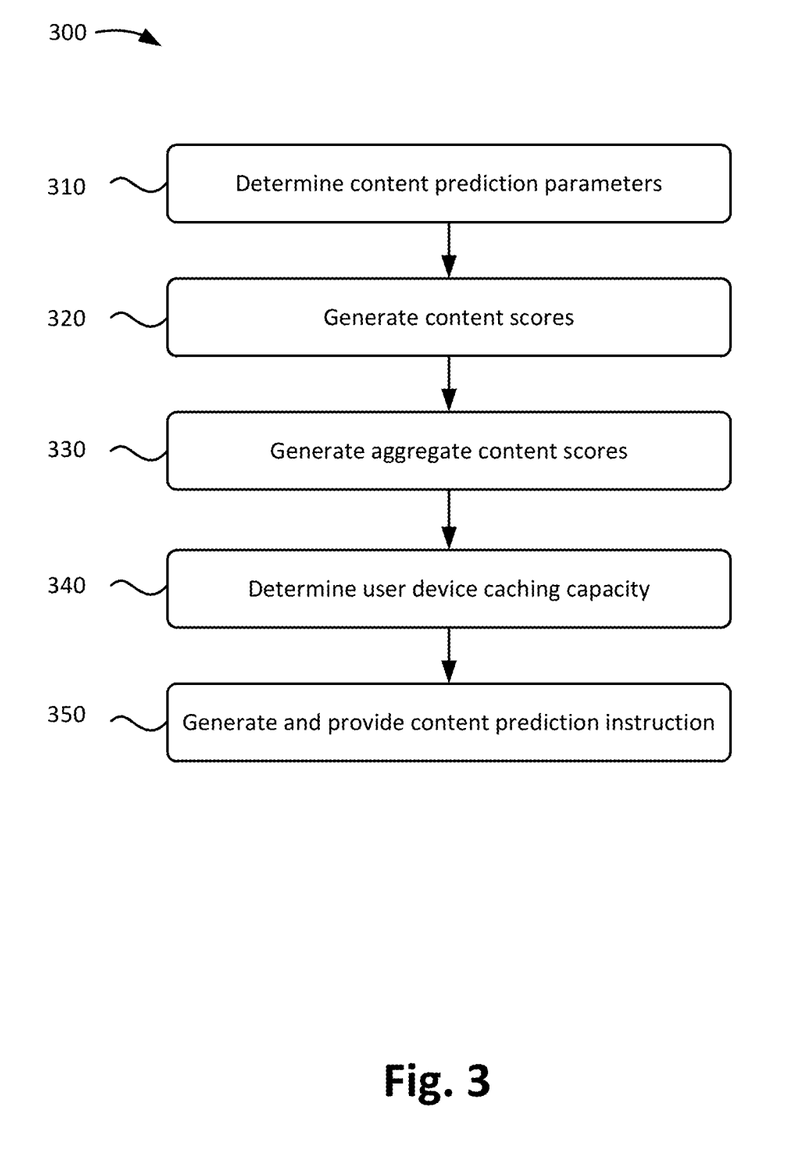
FIG. 3 illustrates a flowchart of an example process for identifying predicted content.

FIG. 3 illustrates a flowchart of an example process 300 for identifying predicted content. The predicted content may correspond to, for example, content that a user is likely to be interested in accessing. In one implementation, process 300 may be performed by one or more components of content prediction system 220. In another implementation, some or all of blocks of process 300 may be performed by one or more components of another device in environment 200 (e.g., user device 210 and/or content delivery system 230), or a group of devices including or excluding content prediction system 220.

As shown in FIG. 3, process 300 may include determining content prediction parameters (block 310). For example, content prediction system 220 may determine content prediction parameters that may be used to predict content that a user, of user device 210, may be likely to select. In some implementations, content prediction system 220 may determine content prediction parameters, such as information identifying a user's content viewing history, a user's content preferences, and/or a measure of content popularity. Additionally, or alternatively, content prediction system 220 may determine broadcast channels that are adjacent to a broadcast channel associated with content currently being received by user device 210. In some implementations, adjacent broadcast channels may include channels adjacent to a channel currently selected by a user. For example, if Channel 5 is selected, Channels 4 and 6 may be considered to be adjacent to Channel 5. Additionally, or alternatively, a previously selected channel may be an adjacent channel. Additional examples of adjacent channels are described in greater detail below.

In some implementations, content prediction system 220 may determine content that other users, associated with a user's social networking account, may currently be accessing. Additionally, or alternatively, content prediction system 220 may determine some other content prediction parameter.

In some implementations, content prediction system 220 may monitor and store information relating to the user's content viewing history. In some implementations, the user's content viewing history may correspond to channels that the user has historically selected to view, television shows and/or movies the user has historically selected to view, genres of television shows and/or movies the user has historically selected to view, etc. Additionally, or alternatively, the user's content viewing history may correspond to television shows and/or movies that the user has historically selected to record.

In some implementations, content prediction system 220 may store a user profile that identifies the user's content preferences. For example, a user may access the user profile to provide content preferences (e.g., the user's favorite television shows and/or genres of content, user ratings associated with content, etc.).

In some implementations, content prediction system 220 may determine a measure of content popularity based on content ratings and user ratings from multiple users. For example, content prediction system 220 may determine the measure of popularity based on a ratings system (e.g., Neilson ratings and/or some other system that identifies a number of households that view particular content). Additionally, or alternatively, content prediction system 220 may determine the measure of popularity based on critic reviews of the content. Additionally, or alternatively, content prediction system 220 may determine the measure of popularity based on some other technique.

In some implementations, content prediction system 220 may receive credentials, associated with a user's social networking account, and may publish content that user device 210 is currently receiving to the user's social networking account. In some implementations, content prediction system 220 may identify content that the user's friends and/or family (e.g., as identified on the user's social networking account) may be accessing. In some implementations, content prediction system 220 may identify content that user may select to view based on public messages associated with the user's social networking account (e.g., a message, such as "Looking forward to watching Content A tonight!").

Process 300 may also include generating content scores (block 320). For example, content prediction system 220 may generate scores for content that content delivery system 230 may provide. In some implementations, content prediction system 220 may generate multiple scores for each content file and/or each channel associated with content the content. For example, content prediction system 220 may generate a "viewing history" score (e.g., based on the user's viewing history and a current time). The "viewing history" score may relate to the likelihood that the user may select to view the content based on the user's viewing history of the content during a particular time period (e.g., a time period corresponding to the broadcast of content, such as a 30-minute time period, a 60-minute time period, or some other time period). As an example, assume that a user has historically accessed Content A more often than Content B during a particular time period. Given this assumption, content prediction system 220 may generate a relatively higher "viewing history" score for Content A than content B during the particular time period. Content prediction system 220 may update the "viewing history" score at different points in time. For example, the "viewing history" score may be based on the user's viewing history during different times in the day. As an example, the "viewing history" score for Content A may be one value at one time, whereas the "viewing history" score for Content A may be a different value at another time.

Additionally, or alternatively, content prediction system 220 may generate a "user preference" score (e.g., based on the user's rating of content). The "user preference" score may relate to the likelihood that the user may select to view the content based on the user's rating of the content and/or some other information identifying content towards which the user has indicated a preference. As an example, assume that the user has rated Content A higher than Content B (e.g., in a user preference profile associated with the user). Given this assumption, content prediction system 220 may generate a relatively higher "user preference" score for Content A than for Content B.

Additionally, or alternatively, content prediction system 220 may generate an "adjacent channel" score (e.g., based on a broadcast channel of content). The "adjacent channel" score may relate to a measure of adjacency between a broadcast channel of the content and a broadcast channel of content currently being provided to user device 210. The measure of adjacency may relate to a number of broadcast channels that separate (e.g., on a channel list, a channel guide, etc.) the broadcast channel of the content and the broadcast channel of content currently being provided to user device 210. In some implementations, the measure of adjacency may correspond to the likelihood that the user may select to view the content based on how closely the broadcast channel of the content is to the broadcast channel of content currently being provided to the user via user device 210 is presented on a channel list or channel guide.

As an example, assume that user device 210 is currently receiving Content C on Channel 5. Given this assumption, content prediction system 220 may generate a higher "adjacent channel" score for content on Channel 6 than for content on Channel 7 (e.g., assuming that Channel 6 is presented closer to Channel 5 on a channel list than Channel 7 is to Channel 5). In some implementations, content prediction system 220 may update the "adjacent channel" score (e.g., when the user selects to change a broadcast channel on user device 210).

Additionally, or alternatively, content prediction system 220 may generate a "popularity" score (e.g., based on viewing ratings of content and/or multiple use ratings of the content). The "popularity" score may relate to a measure of popularity of the content and likelihood that the user may select the content based on the measure of popularity. As an example, assume that Content A has a higher measure of popularity than Content B (e.g., when content A has been accessed a greater number of times than content B, when content A has been rated higher than content B by a multiple users, etc.). Given this assumption, content prediction system 220 may generate a relatively higher "popularity" score for Content A than for Content B.

Additionally, or alternatively, content prediction system 220 may generate a "related content" score (e.g., based on a type and/or genre of the content). The "related content" score may relate to the likelihood that the user may select to view the content based on how closely the type of the content matches a type of content currently being received by user device 210. As an example, assume that the user is currently watching Content C, and that Content C relates to a broadcast of a live sports event. Given this assumption, content prediction system 220 may generate a higher "related content" score for content relating to sports event than content that does not relate to sports events.

Additionally, or alternatively, content prediction system 220 may generate a "social media" score (e.g., based on content that other users, associated with a particular user's social networking account, may be viewing). The "social media" score may relate to the likelihood that the particular user may select to view content based on the particular user's social networking account (e.g., viewing activity of other users and/or social network activity of the particular user, and/or messages or posts indicating content that user may be interested in viewing.). As an example, assume that more users, associated with the social networking account of the particular user, are accessing Content A than Content B. Given this assumption, content prediction system 220 may generate a higher "social media" score for Content A than for Content B. In some implementations, the "social media" score may be factored in to the "popularity" score.

Additionally, or alternatively, content prediction system 220 may generate some other score associated with content provided by content delivery system 230. In some implementations, the content scores may be values on a scale from zero to ten, or may be values on some other scale. Some additional examples of generating scores for broadcast channels are described below with respect to FIG. 4.

Process 300 may further include generating aggregate content scores (block 330). For example, content prediction system 220 may generate an aggregate content score for each content file based on the content stores determined in block 320. In some implementations, content prediction system 220 may generate an aggregate score by summing the content scores. In some implementations, content prediction system 220 may apply weights to each of the content scores to determine the aggregate content score. For example, content prediction system 220 may apply a relatively higher weight to a "favorite content" score than to an "adjacent channel" score.

As an example, assume that content prediction system 220 determines that a user device 210 is currently receiving content associated with a particular broadcast channel (e.g., Channel 5). Further, assume that content prediction system 220 generates content scores for Channel 6, including a "viewing history" score of 6, a "user preference" score of 8, an "adjacent channel" score of 10, a "popularity" score of 7, a "related content" score of 5, and a "social media" score of 5. Given these assumptions, content prediction system 220 may generate an aggregate content score of 41 (e.g., the sum of the individual content scores). Additionally, or alternatively, content prediction system 220 may generate an aggregate content score by weighting the individual content scores differently. Assume, for example, that the weightings for the "user preference" score, the "viewing history" score, the "adjacent channel" score, the "popularity" score, the "related content" score, and the "social media" score are 50%, 15%, 10%, 10%, 10%, and 5%, respectively. Given this assumption, content prediction system 220 may generate an aggregate content score of 735 (8*50+6*15+10*10+7*10+5*10+5*5). In a similar manner, content prediction system 220 may generate aggregate content scores for each content and/or broadcast channel. Some additional examples of generating aggregate content scores are described below with respect to FIG. 4.

Process 300 may also include identifying user device caching capacity (block 340). For example, content prediction system 220 may identify a caching capacity of user device 210 based on an amount of storage available on user device 210 and/or a bitrate of content transfer speeds between user device 210 and content delivery system 230. For example, content prediction system 220 may determine a buffer size based on the bitrate, and may determine a quantity of content files that user device 210 may cache based on the buffer size and the available storage. As an example, assume that content prediction system 220 determines a buffer size of 200 megabytes (MB) and that user device 210 has 1000 MB of available storage. Given these assumptions, content prediction system 220 may determine that user device 210 may have a capacity to cache 5 content files. In some implementations, content prediction system 220 may determine different buffer sizes based on the bitrate of different content files. The buffer size may relate to an amount of data for content that user device 210 may store in order to present the content without delay.

Process 300 may further include generating and providing a content prediction instruction (block 350). For example, content prediction system 220 may generate a content prediction instruction based on the content aggregate scores and the user device caching capacity. As an example, assume that content prediction system 220 determines that user device 210 has a capacity to cache 5 content files. Given this assumption, content prediction system 220 may identify the content files having the top 5 aggregate content scores (e.g., predicted content). Further, content prediction system 220 may generate a content prediction instruction that directs user device 210 to request the predicted content from content delivery system 230. The content prediction instruction may further direct user device 210 to buffer the predicted content in accordance with the determined buffer size. In some implementations, the content prediction instruction may direct user device 210 to buffer real-time broadcasted content associated with broadcast channels. For example, the content prediction instruction may direct user device 210 to buffer real-time broadcast content associated with 5 channels, associated with content having the top 5 aggregate content scores.

In some implementations, user device 210 may receive the content prediction instruction and may request the predicted content from content delivery system 230. As an example, assume that the content prediction instruction directs user device 210 to buffer real-time broadcasted content associated with broadcast channels 1, 2, 3, 6, and 8 with a 100 MB buffer size for content associated with each broadcast channel. Given this assumption, user device 210 may request the content associated with the broadcast channels 1, 2, 3, 6, and 8, and buffer the content in real-time using a 100 MB buffer size. For example, user device 210 may store a 100 MB portion of the real-time broadcasted content.

User device 210 may continuously buffer the predicted content files such that the content, associated with each broadcast channel, may be presented without delay when a user selects to receive content associated with broadcast channel 1, 2, 3, 6, or 8. As an example, when the user select to receive content associated with broadcast channel 1, user device 210 may present the content for channel 1 from the buffer, and may request content for channel 1 from content delivery system 230. Since user device 210 buffered an initial portion of the content, the initial portion of the content may be presented without delay, and any subsequent portion of the content may be requested from content delivery system 230 while the initial portion is presented by user device 210. As a result, user device 210 may present live broadcasted content without a delay, since an initial portion of the content has been buffered.

In some implementations, block 340 may be omitted, and the content prediction instruction may include a ranked list of channels sorted in the order of content scores. User device 210 may receive the ranked list of channels and buffer a predetermined amount of content. Additionally, or alternatively, user device 210 may buffer as much content as user device 210 can based on available storage.

Figure 4:
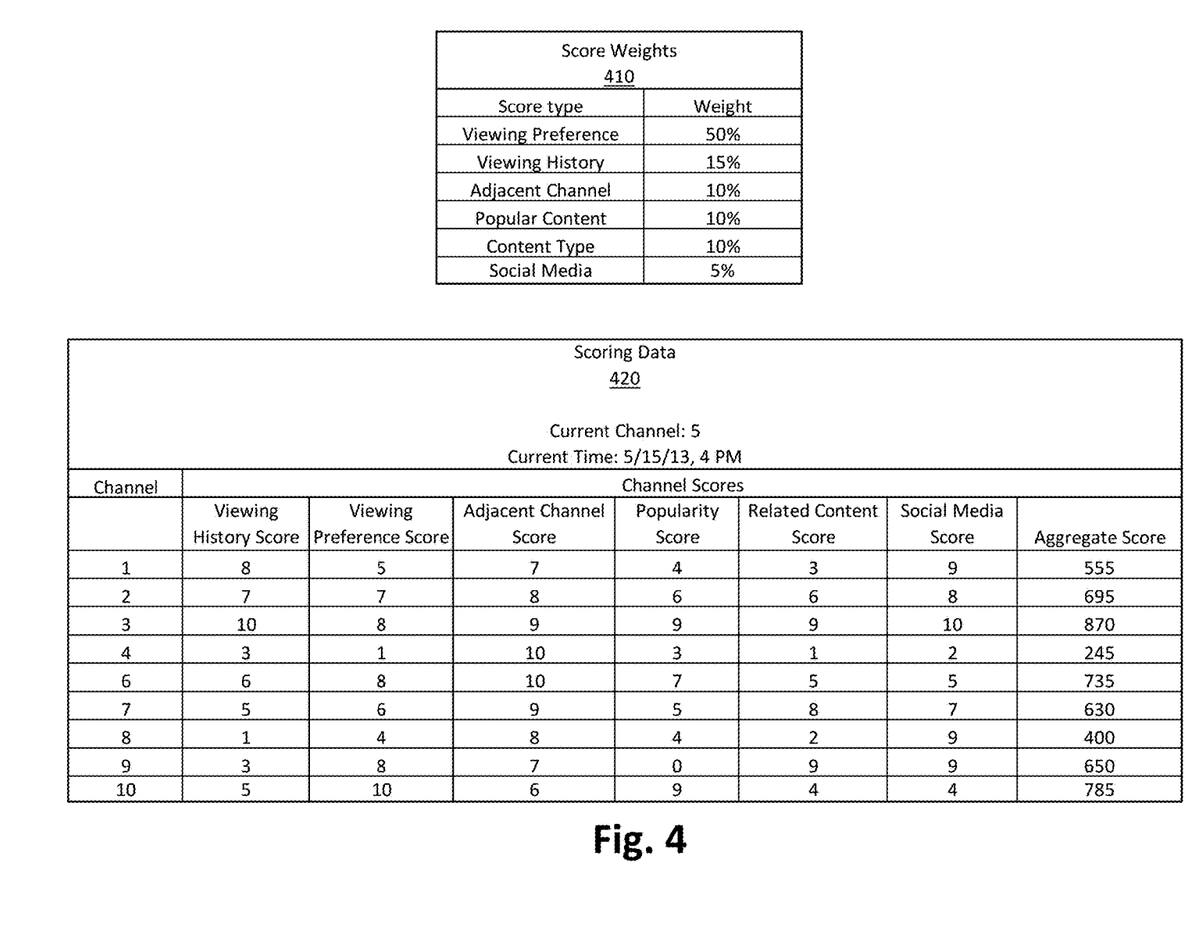
FIG. 4 illustrates example data structures that store content scoring information and scoring weight information.

FIG. 4 illustrates example data structures 410 and 420 that store content scoring and scoring weight information. One or more devices in environment 200, such as content prediction system 220, may store data structures 410 and 420. In some implementations, data structures 410 and 420 may be stored in a memory of content prediction system 220. In some implementations, data structures 410 and 420 may be stored in a memory separate from, but accessible by, content prediction system 220 (e.g., a "cloud" storage device). In some implementations, some other device in environment 200, such as user device 210 and/or content delivery system 230, may store data structures 410 and 420. A particular instance of data structure 410 and/or 420 may contain different information and/or fields than another instance of data structure 410 and/or 420.

As shown in FIG. 4, data structure 410 may store information identifying how content scores are to be weighted in the context of aggregate content scores. For example, data structure 410 may store information identifying that "user preference" scores, "viewing history" scores, "adjacent channel" scores, "popularity" scores, "content type" scores, and "social media" scores are to be weighted differently when content prediction system 220 determines aggregate content scores. In the example shown in FIG. 4, data structure 410 may store information identifying that the "user preference" score is to be weighted at 50%, the "viewing history" score is to be weighted at 15%, the "adjacent channel" score is to be weighted at 10%, the "popularity" score is to be weighted at 10%, the "content type" score is to be weighted at 10%, and the "social media" score is to be weighted at 5%. In some implementations, content prediction system 220 may store a data structure 410 for each user of user device 210 identifying how content scores are to be weighted when generating aggregate content scores for different users of different user devices 210. In some implementations, a user of user device 210 may select the weightings.

Data structure 420 may store scoring data for content associated with different broadcast channels. Information stored by data structure 420 may be based on a current time, a current day of the week, and/or a current broadcast channel associated with content that user device 210 is currently receiving. As shown in FIG. 4, data structure 420 may identify a current viewing broadcast channel (Channel 5), and a current date and time (May 15, 2013, 4 PM).

As shown in FIG. 4, data structure 420 may store content scores for content identified by different broadcast channels. As an example, data structure 420 may store content scores for content associated with broadcast channel 1. In the example shown in FIG. 4, data structure 420 may store, for content associated with broadcast channel 1, six content scores (e.g., on a scale from zero to ten) and an aggregate content score. For example, assume that content prediction system 220 determines a "viewing history" score of 8 based on a frequency that the user has viewed the content of broadcast channel 1 at 4 PM on the particular day of the week corresponding to the current date identified in data structure 420. Given this assumption, data structure 420 may store a "viewing history" score of 8 for the content associated with broadcast channel 1.

Further, assume that content prediction system 220 determines a "user preference" score of 5 based on the user's preferences, user ratings, etc. associated with the content of broadcast channel 1. Given this assumption, data structure 420 may store a "user preference" score of 5. Further, assume that content prediction system 220 determines an "adjacent channel" score of 7 based on the currently viewed channel (e.g., broadcast channel 5) and the number of channels between broadcast channel 1 and channel 5. Given this assumption, data structure 420 may store the "adjacent channel" score of 7. Further, assume that content prediction system 220 determines a "popularity" score of 4 based on other users' ratings and/or viewing history of the content associated with broadcast channel 1. Given this assumption, data structure 420 may store the "popularity" score of 4. Further, assume that content prediction system 220 determines a "related content" score of 3 based on genre or type of the content associated with the currently viewed broadcast channel and the genre or type of the content associated with channel 1. Given this assumption, data structure 420 may store the "related content" score of 3. Further, assume that content prediction system 220 determines a "social media" score of 9 based on viewing history, preferences, and ratings of the content, associated with broadcast channel 1, from users associated with a social networking account of s particular user. Given this assumption, data structure 420 may store a "social media" score of 9.

As further shown in FIG. 4, data structure 420 may store an aggregate content score of 555 for the content associated with broadcast channel 1. The aggregate content score may be based on the content scores and on information stored by data structure 410. For example, the aggregate content score may determined based on the expression: $Score_{Aggregate} = (Score_1 * Weight_1) + (Score_2 * Weight_2) + \ldots (Score_N * Weight_N)$. Additionally, or alternatively, the content score may be based on some other expression or algorithm. In a similar manner, content prediction system 220 may determine content scores and aggregate content scores for content associated with broadcast channels 2, 3, 4, 6, 7, 8, 9, and 10, and data structure 420 may store the content scores and aggregate content scores for the content associated with these broadcast channels. As described above, content prediction system 220 may generate a predicted content instruction based on the aggregate content scores. In some implementations, an aggregate content score may identify a likelihood that the user may select to view particular content based on viewing history information, viewing preference information, popularity information, related content information, information identifying a number of channels separating a currently viewed channel with the channel of the content, and/or some other information. Thus, content having relatively higher aggregate content scores may be prioritized for storage by user device 210 over content having relatively lower aggregate content scores.

While particular fields are shown in a particular format in data structures 410 and 420, in practice, data structures 410 and 420 may include additional fields, fewer fields, different fields, or differently arranged fields than are shown in FIG. 4. Also, FIG. 4 illustrates examples of information stored by data structure 400. In practice, other examples of information stored by data structures 410 and 420 are possible.

Figure 5:
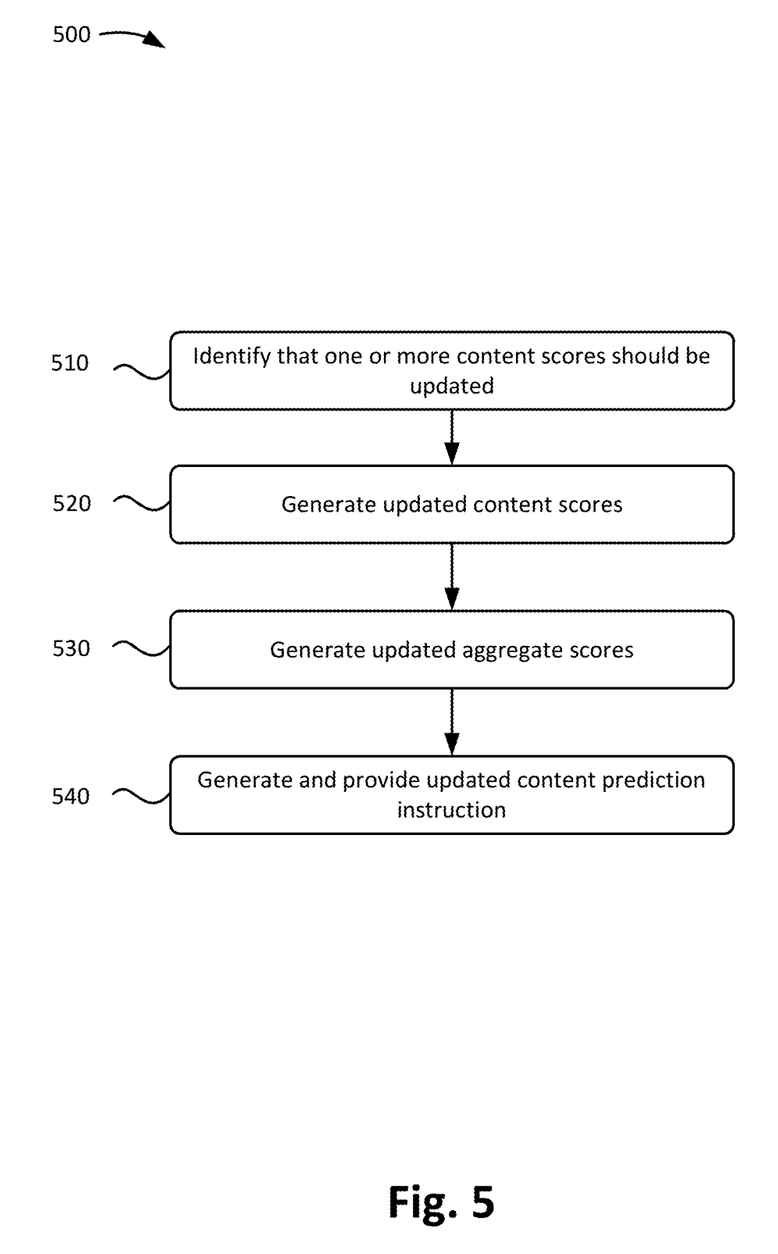
FIG. 5 illustrates a flowchart of an example process for generating updated aggregate scores and an updated content prediction instruction.

FIG. 5 illustrates a flowchart of an example process 500 for generating updated aggregate scores and an updated content prediction instruction. In some implementations, process 500 may be performed by one or more components of content prediction system 220. In some implementations, some or all of blocks of process 500 may be performed by one or more components of another device in environment 200 (e.g., user device 210 and/or content delivery system 230), or a group of devices including or excluding content prediction system 220. In FIG. 5, assume that user device 210 is receiving content, associated with a particular broadcast channel, at a particular time. Further, assume that aggregate content scores (e.g., for content associated with other broadcast channels) have been determined and that a content prediction instruction has been generated. Content prediction system 220 may generate updated aggredate scores and updated content prediction instructions as described below.

As shown in FIG. 5, process 500 may include identifying that one or more content scores should be updated (block 510). For example, the content scores should be updated based on a change in a broadcast channel selection or time period (block 510). For example, as described above, content prediction system 220 may monitor the activity of user device 210, and may identify user device 210 has changed a channel selection from the particular broadcast channel to another broadcast channel (e.g., user device 210 is receiving content associated with the other broadcast channel). Additionally, or alternatively, content prediction system 220 may determine a change in a time period associated with the broadcast of content. As an example, content prediction system 220 may determine a change in a time period at every 30 minutes from the hour (e.g., at 4:00 PM, 4:30 PM, 5:00 PM, 5:30 PM, etc.).

Process 500 may also include generating updated content scores (block 520). For example, content prediction system 220 may generate the updated content scores based on identifying a change in the broadcast channel selection and/or the change in the time period. As described above, the "viewing history" score for particular content may relate to the likelihood that a user of user device 210 may select the particular content at a particular time period. Thus, content prediction system 220 may determine the updated "viewing history" score when determining a change in the time period. As an example, assume that content prediction system 220 had previously generated a "viewing history" score for content, associated with broadcast channel 1, at 4 PM. At 4:30 PM, for example, content prediction system 220 may generate an updated "viewing history" score for content, associated with broadcast channel 1, based on the user's viewing history of the content at 4:30 PM. In some implementations, content prediction system 220 may generate the updated "viewing history" score since the broadcasted content may change from one time period to another, and the user's viewing history may change from one time period to another. Content prediction system 220 may generate respective updated "viewing history" scores for different content associated with different broadcast channels.

As described above, the "viewing preference" score for particular content may relate to the likelihood that the user may select to view the particular content based on the user's preference for the particular content. Thus, content prediction system 220 may determine an updated "viewing preference" score when identifying a change in the time period, corresponding to a change in content that is broadcasted and received by user device 210. As an example, assume that content prediction system 220 had previously generated a "viewing preference" score for content received by user device 210 at 4 PM. At 4:30 PM, for example, content prediction system 220 may generate an updated "viewing preference" score for content that was different from content that was received by user device 210 at 4 PM. Assuming that the content, received by user device 210, at 4:30 PM was different than the content received at 4 PM, content prediction system 220 may also generate an updated "popularity" score, an updated "related content" score, and an updated "social media" score for the different content.

As described above, the "adjacent channel" score may relate to the likelihood that the user may select content based on a number of broadcast channels that are within a currently selected broadcast channel. Thus, content prediction system 220 may generate updated "adjacent channel" scores when identifying a change in the selected broadcast channel. As an example, assume that content prediction system 220 had previously generated an "adjacent channel" score for content associated with broadcast channel 1 when user device 210 was receiving content associated with broadcast channel 2. Further, assume that content prediction system 220 identifies a change in the broadcast channel selection from broadcast channel 2 to broadcast channel 3. Given this assumption, content prediction system 220 may generate an updated "adjacent channel" score for the content associated with broadcast channel 1 when content prediction system 220 identifies the change in the broadcast channel selection from broadcast channel 2 to broadcast channel 3.

Process 500 may further include generating updated aggregate scores (530). For example, content prediction system 220 may generate updated aggregate scores based on generating the updated content scores. In some implementations, content prediction system 220 may generate the updated aggregate scores in a similar manner as described above with respect to process 300 and as described with respect to data structures 410 and 420.

Process 500 may also include generating and providing an updated content prediction instruction (block 540). For example, content prediction system 220 may generate an updated content prediction instruction based on the updated aggregate scores. In some implementations, the updated content prediction instruction may be based on a buffer size and caching capacity of user device 210. The updated content prediction instruction may direct user device 210 to buffer content based on the updated aggregate scores (e.g., content associated with the top 5 aggregate content scores, the top 10 aggregate content scores, etc., based on the buffer size and caching capacity of user device 210). As a result, user device 210 may store predicted content. When the predicted content is selected by the user of user device 210, the predicted content may be presented with a shorter delay than if the predicted content were not stored (e.g., since an initial amount of the predicted content has been stored by user device 210).

Figure 6:
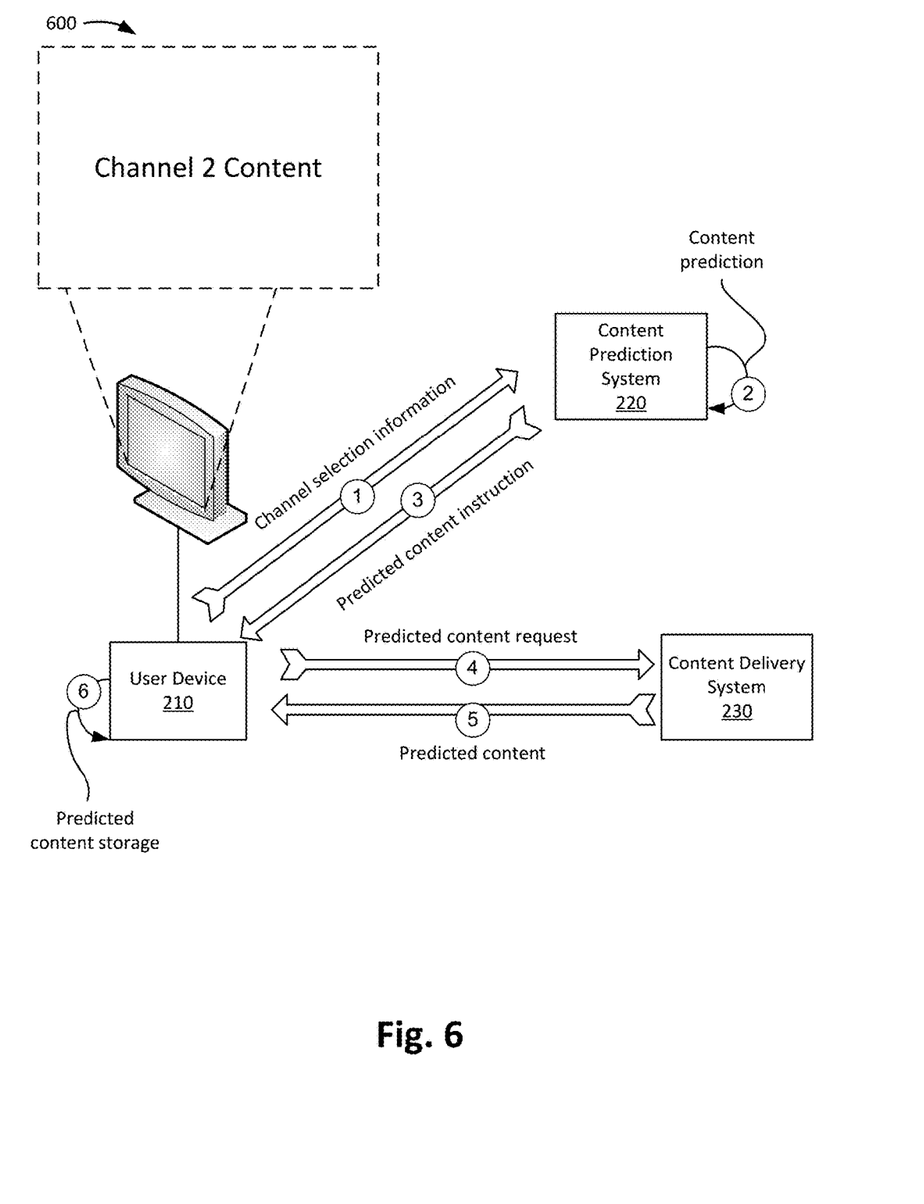
FIGS. 6 and 7 illustrates an example implementation for generating a predicted content instruction and an updated predicted content instruction.
Figure 7:
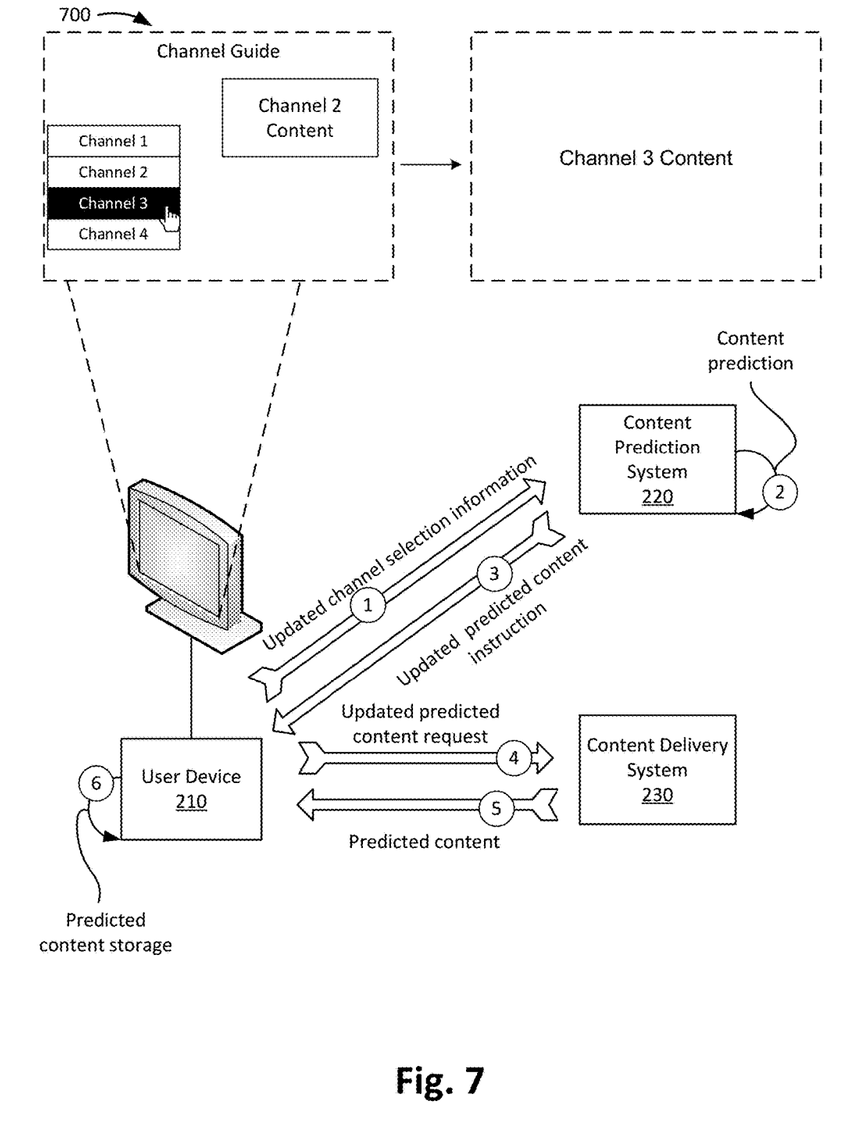

FIGS. 6 and 7 illustrate an example implementation for generating a predicted content instruction and an updated predicted content instruction. In FIG. 6, assume that user device 210 is currently receiving content associated with a particular broadcast channel (e.g., "Channel 2" as shown in interface 600). As shown in FIG. 6, user device 210 may provide channel selection information to content prediction system 220 (arrow 1). In some implementations, the channel selection information may identify that user device 210 is receiving the content for Channel 2. Based on receiving the channel selection information, content prediction system 220 may generate content scores, aggregate content scores, and a content prediction instruction (arrow 2) in a similar manner as described above. For example, content prediction system 220 may generate content "viewing history" scores, "viewing preference" scores, "popularity" scores, "social media" scores, and/or some other scores associated with content of other broadcast channels. Further, content prediction system 220 may generate "adjacent channel" scores based on a number of broadcast channels that are within the selected channel (e.g., Channel 2). Further, content prediction system 220 may generate "related content" scores identifying channels having content of a similar type as the content of Channel 2.

Content prediction system 220 may generate aggregate content scores based on the individual content scores, and the predicted content instruction based on the aggregate content scores. As further shown in FIG. 6, content prediction system 220 may provide the predicted content instruction to user device 210 (arrow 3), and user device 210 may provide a predicted content request (arrow 4) to content delivery system 230. Content delivery system 230 may provide the predicted content (arrow 5), and user device 210 may store and continuously buffer the predicted content (arrow 6). As a result, content of a predicted channel may be presented by user device 210 when the content of the predicted channel is selected for viewing by a user of user device 210. Further, the content of the predicted channel may be presented with a shorter delay than when the predicted content is not stored and buffered by user device 210.

Referring to FIG. 7, a user of user device 210 may select to present a channel guide having a list of multiple broadcast channels that may be selected to receive content. As shown in interface 700, content for Channel 2 may be presented within the channel guide (e.g., since content for Channel 2 was previously selected for viewing), and the user may scroll through the list of broadcast channels to receive information regarding content associated broadcast channels included in the channel guide.

As the user scrolls through the list of broadcast channels, content prediction system 220 may update content scores, content aggregate scores, and content prediction instructions based on a broadcast channel selected within the channel guide. For example, when the user scrolls from Channel 3 to Channel 4 in the channel guide, "adjacent channel" scores may be updated. As shown in FIG. 6, user device 210 may provide updated channel selection information to content prediction system 220 (arrow 1). In some implementations, the updated channel selection information may identify a broadcast channel with which the user has selected within the channel guide. Based on receiving the updated channel selection information, content prediction system 220 may generate content scores, content aggregate scores, and content prediction instructions. For example, when Channel 3 is selected in the channel guide, the "adjacent channel" score for the content of Channel 3 may be updated to a higher value than when Channel 3 was not selected (e.g., when user device 210 was not presenting the channel guide). In some implementations, the "adjacent channel" for the Channel 3 content score may be updated when Channel 3 is selected for a particular threshold amount of time.

In a similar manner as described above, content prediction system 220 may generate an updated content prediction instruction (arrow 2) based on the updated content aggregate scores (including the updated "adjacent channel" scores), and provide the updated predicted content instruction to user device 210 (arrow 3). User device 210 may provide an updated predicted content request to content delivery system 230 (arrow 4), receive the predicted content (arrow 5), and store and buffer the predicted content (arrow 6). As a result, content of a predicted channel may be presented by user device 210 when the content of the predicted channel is selected for viewing by a user of user device 210. Further, the content of the predicted channel may be presented with a shorter delay than when the predicted content is not stored and buffered by user device 210. For example, user device 210 may store and buffer the content of Channel 3 based on receiving the updated content prediction instruction, and may present the content of Channel 3 when the user selects to view the content of Channel 3. Further, the content of Channel 3 may be presented with a shorter delay than if user device 210 did not store and buffer the content of Channel 3. Also, content prediction system 220 may generate updated content prediction instructions as a user scrolls through channels in a channel guide.

While particular examples are shown in FIGS. 6 and 7, the above description are merely example implementations. In practice, other examples are possible from what is described above in FIGS. 6 and 7. Also, particular formats of interface 600 and 700 are shown, in practice, interface 600 and 700 may have a different format and appearance than what is shown in FIGS. 6 and 7.

Figure 8:
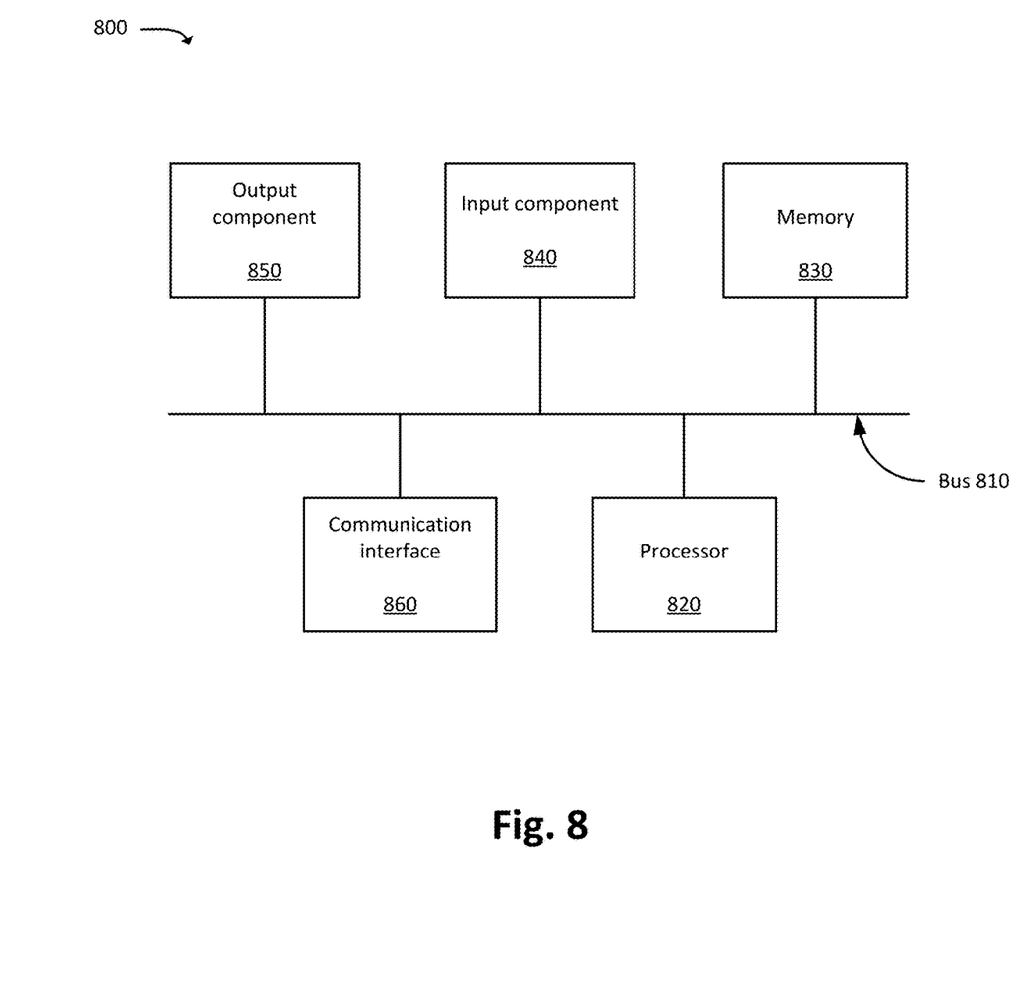
FIG. 8 illustrates example components of a device, according to one or more implementations described herein.

FIG. 8 is a diagram of example components of device 800. One or more of the devices described above (e.g., with respect to FIGS. 1, 2, 6, and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 3 and 5, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2 and 3), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   determining, by a server device, content prediction parameters associated with a plurality of content, wherein each content is associated with a particular broadcast channel of a plurality of broadcast channels, the content prediction parameters for each content including:
      a measure of popularity of the content,
      a quantity of broadcast channels in between the particular broadcast channel associated with the content and a broadcast channel of content currently being provided to a user device, and
      an indication of activity, with regard to the content, of a social networking account of a user of the user device;
   determining a plurality of weights that are each associated with a particular one of the content prediction parameters, wherein at least two of the content prediction parameters are associated with different weights;
   determining a first weighted score for each content, of the plurality of content, based on:
      the measure of popularity of the content, and
      a first weight, of the plurality of weights;
   determining a second weighted score for each content, of the plurality of content, based on:
      the quantity of broadcast channels in between the broadcast channel of the content and the broadcast channel of content currently being provided to the user device,
         wherein a lower quantity of broadcast channels in between the broadcast channel of the content and the broadcast channel of the content currently being provided to the user device results in a higher second weighted score for the content than a higher quantity of broadcast channels in between the broadcast channel of the content and the broadcast channel of the content currently being provided to the user device, and
      a second weight, of the plurality of weights;
   determining a third weighted score for each content, of the plurality of content, based on:
      the activity, with regard to the content, of the social networking account of the user of the user device, and
      a third weight, of the plurality of weights;
   generating, by the server device and based on the first, second, and third weighted scores, respective content prediction aggregate scores for each of the plurality of content;
   ranking, by the server device, two or more broadcast channels, of the plurality of broadcast channels according to the generated aggregate scores;
   generating, by the server device, a content prediction instruction based on the respective content prediction aggregate scores, the content prediction instruction including the ranking of the two or more broadcast channels; and
   providing, by the server device, the content prediction instruction to cause the user device to:
      determine, based on the ranking and an amount of available storage on the user device, which content, of the plurality of content, to receive and store, and
      receive and store the determined content, of the plurality of content.

2. The method of claim 1, wherein each of the plurality of content is associated with live broadcasted content associated with a respective broadcast channel.

3. The method of claim 1, wherein the content prediction parameters further include at least one of:
   a content viewing history, or
   a content viewing preference.

4. The method of claim 1, wherein generating the respective content prediction aggregate scores is further based on a current time period, the method further comprising:
   identifying a change in the current time period;
   generating updated content prediction aggregate scores based on identifying the change in the time period;
   generating an updated content prediction instruction based on the updated content prediction aggregate scores; and
   providing the updated content prediction instruction to the user device.

5. The method of claim 1, wherein generating the respective content prediction aggregate scores is further based on a broadcast channel associated with content currently being received by the user device, the method further comprising:

identifying a change in the broadcast channel corresponding to a change in content currently being received by the user device;
generating updated content prediction aggregate scores based on identifying the change in the broadcast channel;
generating an updated content prediction instruction based on the updated content prediction aggregate scores; and
providing the updated content prediction instruction to the user device.

6. A system comprising:
a non-transitory memory device storing a plurality of processor-executable instructions; and
a processor configured to execute the processor-executable instructions, wherein executing the processor-executable instructions causes the processor to:
identify a social networking account associated with a user of a user device;
identify one or more contacts of the social networking account of the user;
identify activity, of the one or more contacts of the social networking account, regarding a plurality of content;
generate a first score for each of the plurality of content, based on:
the identified activity, of the one or more contacts regarding the content, and
a first weight;
generate a second score for each of the plurality content, based on:
a measure of popularity of the content, and
a second weight that is different from the first weight;
generate a third score for each of the plurality content, based on:
a quantity of broadcast channels in between a broadcast channel of the content and a broadcast channel of content currently being provided to the user device,
wherein a lower quantity of broadcast channels in between the broadcast channel of the content and the broadcast channel of the content currently being provided to the user device results in a higher third score for the content than a higher quantity of broadcast channels in between the broadcast channel of the content and the broadcast channel of the content currently being provided to the user device;
generate respective content prediction aggregate scores for each of the plurality of content based on the first score, the second score, and the third score respectively associated with each of the plurality of content;
rank the plurality of content according to the generated content prediction aggregate scores for each of the plurality of content;
generate a content prediction instruction based on the respective content prediction aggregate scores, the content prediction instruction including information regarding the ranking of the plurality of content; and
provide the content prediction instruction to cause the user device to:
determine, based on the ranking and an amount of available storage on the user device, which content, of the plurality of content, to receive and store, and
receive and store the determined content, of the plurality of content.

7. The system of claim 6, wherein each of the plurality of content is associated with live broadcasted content associated with a respective broadcast channel.

8. The system of claim 6, wherein the content prediction aggregate scores are further based on at least one of:
a content viewing history; or
a content viewing preference.

9. The system of claim 6, wherein generating the respective content prediction aggregate scores is further based on a current time period, wherein executing the processor-executable instructions further causes the processor to:
identify a change in the current time period;
generate updated content prediction aggregate scores based on identifying the change in the time period;
generate an updated content prediction instruction based on the updated content prediction aggregate scores; and
provide the updated content prediction instruction to the user device.

10. The system of claim 6, wherein generating the respective content prediction aggregate scores is further based on a broadcast channel associated with content currently being received by the user device,
wherein executing the processor-executable instructions further causes the processor to:
identify a change in the broadcast channel corresponding to a change in content currently being received by the user device;
generate updated content prediction aggregate scores based on identifying the change in the broadcast channel;
generate an updated content prediction instruction based on the updated content prediction aggregate scores; and
provide the updated content prediction instruction to the user device.

11. A user device, comprising: a non-transitory memory device storing a plurality of processor-executable instructions; and
a processor configured to execute the processor-executable instructions, wherein executing the processor-executable instructions causes the processor to:
receive and present a first live broadcasted content;
receive a content prediction instruction that includes a ranked list of two or more additional live broadcasted content, the two or more additional live broadcasted content including at least a second live broadcasted content and a third live broadcasted content, the ranked list having been generated based on respective content prediction aggregate scores for each of the two or more additional live broadcasted content, wherein the content prediction aggregate score for a particular live broadcasted content, of the two or more additional live broadcasted content, is based on:
a first score, for the particular live broadcasted content, that is based on a first weight and a measure of popularity of the particular live broadcasted content,
a second score, for the particular live broadcasted content, that is based on a second weight and a measure of relatedness, of the particular live broadcasted content, to the first live broadcasted content, and
a third score, for the particular live broadcasted content, that is based on a third weight and a quantity of broadcast channels in between a broadcast channel of the particular live broadcasted content and a broadcast channel of the first live broadcasted content,
wherein a lower quantity of broadcast channels in between the broadcast channel of the first live broadcasted content and the broadcast channel of the particular live broadcasted content results in a higher third weighted score for the particular live broadcasted content than a higher quantity of broadcast channels in between the broadcast channel of the first live broadcasted content and the broadcast channel of the particular live broadcasted content,
wherein at least two of the first, second, and third weights are different weights;
select, based on the ranked list and further based on an amount of available storage of the user device, one or more live broadcasted content, of the two or more additional live broadcasted content, to present;
request the selected live broadcasted content;
receive the selected live broadcasted content;
buffer the selected live broadcasted content while the first live broadcasted content is presented;
receive a request to present the selected live broadcasted content after buffering the selected live broadcasted content; and
switch from presenting the first live content to presenting the buffered selected live broadcasted content based on receiving the request.

12. The user device of claim 11, wherein executing the processor-executable instructions further causes the processor to:
provide channel viewing information identifying the first content currently being received by the user device,
wherein the content prediction instruction is generated based on the provided channel viewing information.

13. The user device of claim 11, wherein executing the processor-executable instructions further causes the processor to:
provide channel viewing information identifying the selected live broadcasted content, after receiving the request for the selected live broadcasted content;
receive, based on providing the channel viewing information, an updated content prediction instruction identifying a fourth live broadcasted content;
request the fourth live broadcasted content;
receive the fourth live broadcasted content; and
buffer the fourth live broadcasted content in real-time.

14. The user device of claim 11, wherein executing the processor-executable instructions further causes the processor to:
receive, after a particular time period has elapsed since receiving the content prediction instruction, an updated content prediction instruction identifying a fourth live broadcasted content;
request the fourth live broadcasted content;
receive the fourth live broadcasted content; and
buffer the fourth live broadcasted content in real-time.

15. The method of claim 1, wherein the indication of activity, with regard to the content, includes a public message associated with the social networking account of the user, the public message including a mention of the content.

16. The method of claim 1, wherein determining the indication of activity, with regard to the content, includes:
identifying one or more social networking accounts, of one or more other users, that are associated with the social networking account of the user of the user device; and
determining, based on the one or more social networking accounts of the one or more other users, that at least one of the one or more other users have accessed the content.

17. The method of claim 1,
wherein determining the first weighted score, for the particular content, includes:
determining a first unweighted score associated with the measure of popularity of the particular content, and
applying the first weight to the first unweighted score to determine the first weighted score,
wherein determining the second weighted score, for the particular content, includes:
determining a second unweighted score associated with the quantity of broadcast channels in between the broadcast channel of the content and a broadcast channel of content currently being provided to the user device, and
applying the second weight to the second unweighted score to determine the second weighted score, and
wherein determining the third weighted score, for the particular content, includes:
determining a third unweighted score associated with the activity, with regard to the content, of the social networking account of the user of the user device, and
applying the third weight to the third unweighted score to determine the third weighted score.

18. The system of claim 6,
wherein the processor-executable instructions, to generate the first score for the particular content, further cause the processor to:
determine a first unweighted score associated with the identified activity, of the one or more contacts regarding the content, and
apply the first weight to the first unweighted score, and
wherein the processor-executable instructions, to generate the second score for the particular content, further cause the processor to:
determine a second unweighted score associated with the measure of popularity of the content or the quantity of broadcast channels in between the broadcast channel of the content and the broadcast channel of content currently being provided to the user device, and
apply the second weight to the second unweighted score.

19. The user device of claim 11, wherein the ranked list has further been generated based on an indication of activity, with regard to each of the second and third live broadcasted content, of a social network account of a user of the user device.

20. The user device of claim 11, wherein the ranked list has further been generated based on a content viewing history associated with the user device.

* * * * *